[91.]                    THOMAS S. HALL.                 8 Sheets--Sheet 8.
              Railroad Signal Apparatus.
No. 118,606.                                Patented Aug. 29, 1871.

UNITED STATES PATENT OFFICE.

THOMAS S. HALL, OF WEST MERIDEN, CONNECTICUT.

IMPROVEMENT IN ELECTRO-MAGNETIC SIGNAL APPARATUS FOR RAILROADS.

Specification forming part of Letters Patent No. 118,606, dated August 29, 1871.

*To all whom it may concern:*

Be it known that I, THOMAS S. HALL, of West Meriden, in the county of New Haven and State of Connecticut, have invented a new and useful Improvement in Electro-Magnetic Railroad Signal Apparatus; and I do hereby declare the following to be a full, clear, and exact description thereof, which will enable those skilled in the art to make and use the same, reference being had to the accompanying drawing forming part of this specification, in which drawing—

Fig. 6 is a face view of the secondary signal-house.

Similar letters indicate corresponding parts.

This invention relates to a system of signals and keys, said keys being acted on by the wheels or any other part of railroad trains, and serving to throw an electic current on to or off from the signals, which are situated at suitable distances apart on the side of the track in such a manner that by the action of the train itself the signals are first put on and kept on until the train has passed the point of danger, and finally taken off by the action of the train. Each train acts on two signals, one behind and the other ahead, and, by the action of the train itself, both signals are put on and taken off again, ready to be acted on by the next train, said signals being situated at such distances apart that no train is liable to run into another, whether the trains run on the same track and in the same direction or on the same track and in opposite directions. With the track-keys and their connections are also combined crossing-signals, to be operated by the action of the wheels of a train on said keys in the same manner as the line-signals. The peculiar connection of the keys and signals with each other and with the batteries will be readily understood from the following description; and I will first describe the application of my system to a single-track road on which trains of cars run in both directions. In describing this single-track system reference will be had to Figs. 1, 3, 4, 5, 6, and 7 of the drawing, in which—

Figure 1:
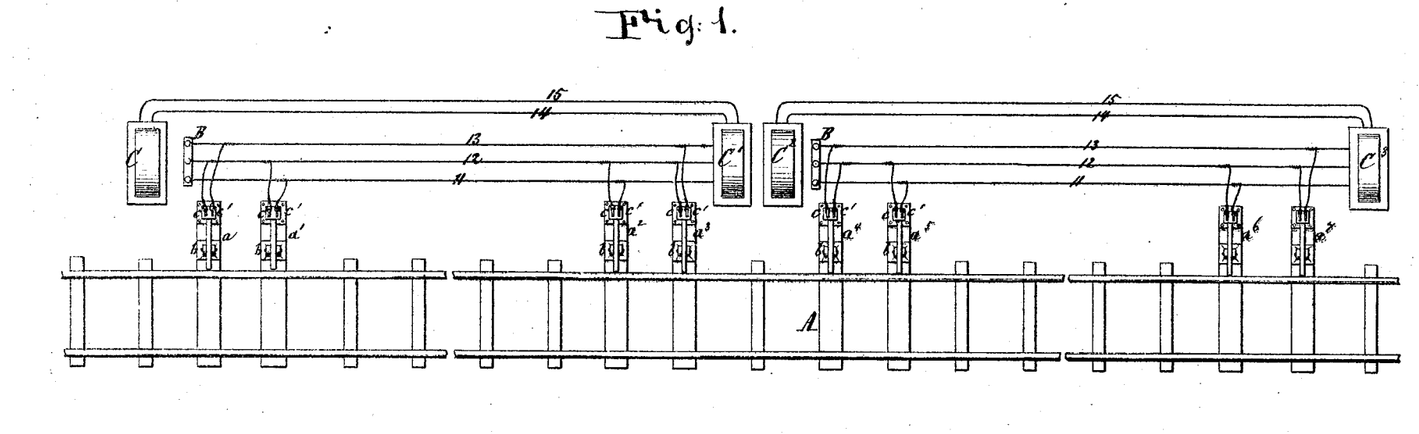
Figure 1 represents a plan or top view of my apparatus as applied to a single-track road.

A designates a single railroad track, on one side of which are arranged a series of keys, $a\ a^1\ a^2\ a^3\ a^4\ a^5\ a^6\ a^7$, which have their fulcrums on pivots $b$, and are in such a position that their inner ends are close to one of the rails and somewhat elevated above the surface of said rail, so that the wheels of a locomotive or car running on the track will depress said inner ends, and whenever this takes place the outer ends of said keys are pressed up, each between two springs, $c\ c^1$, which connect with the line-wires 11, 12, and 13, as shown in Fig. 1—that is to say, the springs of the keys $a$, $a^3$, $a^4$, and $a^7$ connect, one with the wire 12 and the other with the wire 13, and the springs of the keys $a^1$, $a^2$, $a^5$, and $a^6$, one with the wire 12 and the other with the wire 11. These wires are supported on posts B, being insulated from said posts and from each other in the usual manner, and their ends extend to and are connected with signal-houses $C^1\ C^3$, which are situated on the side of the track, and each of which connects by wires 14 and 15 with a secondary signal-house, C or $C^2$, as shown in Fig. 1. By referring to this figure it will be seen that these signal-houses are arranged in pairs, which are entirely independent of each other, the houses constituting one pair being situated at a distance of two miles (more or less) from each other. The construction of the signal-houses, and their connection with each other and with the line-wires, will be best understood by referring to Figs. 3, 4, 5, and 6 of the drawing. Each of these houses consists of a box or casing, $d$, provided with an aperture, $e$, in the side facing toward the direction in which the signal is to be displayed. On the side of the aperture $e$ rises a stud, $f$, which forms the fulcrum for a lever, $g$, on one end of which is secured the signal-disk $h$, while on its other is placed an adjustable balance-weight, $p$. From the hub of the lever $g$ extends a chain, $i$, to an arm, $j$, projecting from a rock-shaft, $k$, on which is mounted a second arm, $l$, which connects by a rod, $m$, with the armature-lever $n$ of an electro-magnet, $o$. If the armature is attracted the rod $m$ is forced upward and the signal-lever $g$ is turned on its pivot so as to bring the signal-disk $h$ opposite the aperture $e$, and consequently the signal is displayed; but as soon as the circuit of the electro-magnet $o$ is broken the signal-disk, which somewhat overbalances the weight $p$, drops back to the position shown in Fig. 3, and the signal is taken off. One end of the helix of the electro-magnet $o$ is in metallic connection with a wire, 16, leading to one pole of a battery, D, the other pole of which connects by a wire, 17, with the metallic abutment $q$. A similar abutment, $q'$, connects by a wire, 18, with the other end of the helix of the electro-magnet $o$, and the two abutments $q$ $q'$ can be brought in metallic contact by a key, $r$. If this key is pressed up against both abutments $q$ $q'$, the current of the battery D passes through wires 16 to one end of the helix $o$, and through this helix the wire 18, the abutment $q'$, key $r$, abutment $q$, and wire 17, back to the battery, the armature of the electro-magnet $o$ is attracted, and the signal is displayed and kept displayed until the key $r$ is removed from the abutments. The key $r$ connects by a lever, $s^*$, and rod $s$ with the armature-lever $t$ of an electro-magnet, $u$, (best seen in Fig. 4,) and the helix of this electro-magnet connects at one end with the wire 11 and at the other end with wires 22 and 19, leading to one of the poles of a battery, $D^2$. The other pole of this battery is in direct contact with the line-wire 12, and if the line-wires 11 and 12 are brought into metallic contact by one of the raising track-keys $a^1$, $a^2$, $a^5$, or $a^6$, or by any other means, the circuit of the electro-magnet $u$ is closed, its armature is attracted, the key $r$ is brought in contact with the abutments $q$ $q'$, the circuit of the electro-magnet $o$ is closed, and the signal is displayed. With the signal $h$ is combined an alarm-bell, $v$, the hammer of which is actuated by an electro-magnet, $w$, the helix of which connects at one end with the wire 19, while its other end connects with a stud, $x^*$, in which is secured a spring, $y$, carrying the armature $z$ and the hammer $b^2$. The spring $y$ has a tendency to draw the armature away from the electro-magnet, and if left to follow its elasticity it bears against a spring, $c^2$, which is in metallic connection with a wire, 20, leading to an abutment, $d^2$, under the signal-magnet $o$. A similar abutment, $d^{21}$, connects by a wire, 21, with the line-wire 12. The abutments $d^2$ and $d^{21}$ can be brought in metallic contact by a key, $e^2$, which connects with and is actuated by the armature-lever of the signal-magnet $o$. Whenever the circuit through this signal-magnet is closed the key $e^2$ is depressed on the abutments $d^2$ and $d^{21}$ and the circuit through the alarm-bell magnet is closed. The armature of this magnet is attracted and the hammer is thrown in contact with the bell. But as soon as the hammer-spring $y$ is thrown out of contact with the spring $c^2$ the circuit through the alarm-bell magnet $w$ is broken, the armature falls back, and the contact between the spring $y$ and $c^2$ is restored. The circuit is again closed and the hammer thrown in contact with the bell, and so on as long as the circuit through the signal-magnet remains closed. When this circuit is broken the key $e^2$ falls back from the abutments $d^2$ $d^{21}$, and as the signal is taken off the alarm-bell ceases to ring.

It has been previously remarked that whenever one of the raising track-keys $a^1$ $a^2$ $a^5$ $a^6$ is depressed, the circuit through the electro-magnets $u$, $o$, and $w$ is closed; but as soon as the key returns to its original position, the circuit through the electro-magnet $u$ is broken, and if the armature of this electro-magnet should be permitted to fall back, the key $r$ would recede from the abutments $q$ $q'$, and the circuit through the electro-magnets $o$ and $w$ would also be broken; or, in other words, the signal would be taken off immediately after having been put on, and the alarm-bell would cease to ring immediately after having been started. To prevent this, and to keep the signal displayed and the alarm-bell ringing until one of the reversing track-keys $a$, $a^3$, $a^4$, or $a^7$ is depressed, I have applied a spring-catch, $f^2$, which drops in front of the armature-lever of the electro-magnet $u$ as soon as the same has been attracted, and retains the key $r$ in contact with the abutments $q$ $q'$ after the circuit through the electro-magnet $u$ is broken. On the spring-catch $f$ is secured the armature $g^2$ of an electro-magnet, $h^2$, the helix of which is in contact at one end with the line-wire 13, and at the other end with the wire 19, leading to one of the poles of the battery $D^2$. The other pole of this battery connects with the line-wire 12. If the wires 12 and 13 are brought in metallic contact, which is done whenever one of the reversing track-keys $a$, $a^3$, $a^4$, or $a^7$ is depressed, the circuit through the electro-magnet $h^2$ is closed, the armature $g^2$ is attracted, and the spring-catch $f^2$ releases the armature of the electro-magnet $u$, the key $r$ drops back from the abutments $q$ $q'$ and the circuit through the electro-magnets $o$ and $w$ are broken.

By referring to Fig. 1 of the drawing it will be seen that the line-wires 11, 12, and 13 are connected with one of the signal-houses in each pair —that is to say, with the houses C and $C^3$, and these houses connect by wires 14 and 15 with the houses C and $C^2$, respectively. In order to explain this connection, reference must be had to Fig. 3, which represents the signal-house $C^1$ or $C^3$, or the main signal-house in each pair, and to Fig. 6, which represents one of the secondary signal-houses. The wire 14 extends from one pole of the battery $D^1$, and it connects with one end of the helix of the electro-magnet $o^*$ in the house C, Fig. 6. The wire 15 connects with the other end of said helix, and with an abutment, $i^2$, in the main signal-house $C^1$. A corresponding abutment, $i^{21}$, in this last-named house, connects by a wire, 23, with the other pole of the battery $D^1$. Whenever the armature of the electro-magnet $u$ in the main house $C^1$ is attracted, a key, $j^2$, which is connected to this armature is brought in contact with the abutments $i^2$ and $i^{21}$, and the circuit through the electro-magnet $o^*$ in the secondary house C is closed, so as to display the signal and ring the alarm-bell (if such is provided) in said house. The key $j^2$ is held in contact with the abutments $i^2$ $i^{21}$ by the spring-catch $f^2$, and the signals in both houses $C^1$ and $C$ remain displayed until the circuit through the electro-magnet $h^2$ is closed, and the keys $r$ and $j^2$ are permitted to drop back from their respective abutments.

Figure 2:
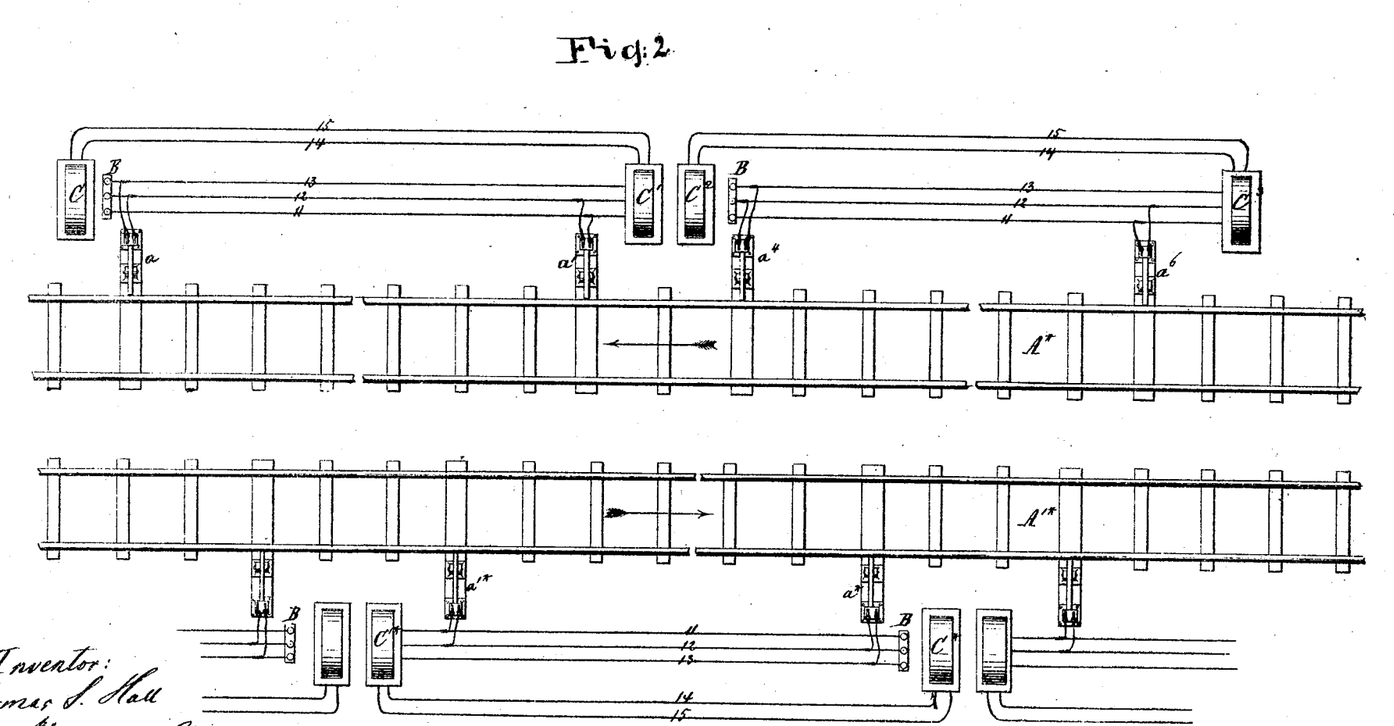
Fig. 2 is a similar view of the same when applied to a double-track road.
Figures 3, 4, 5:
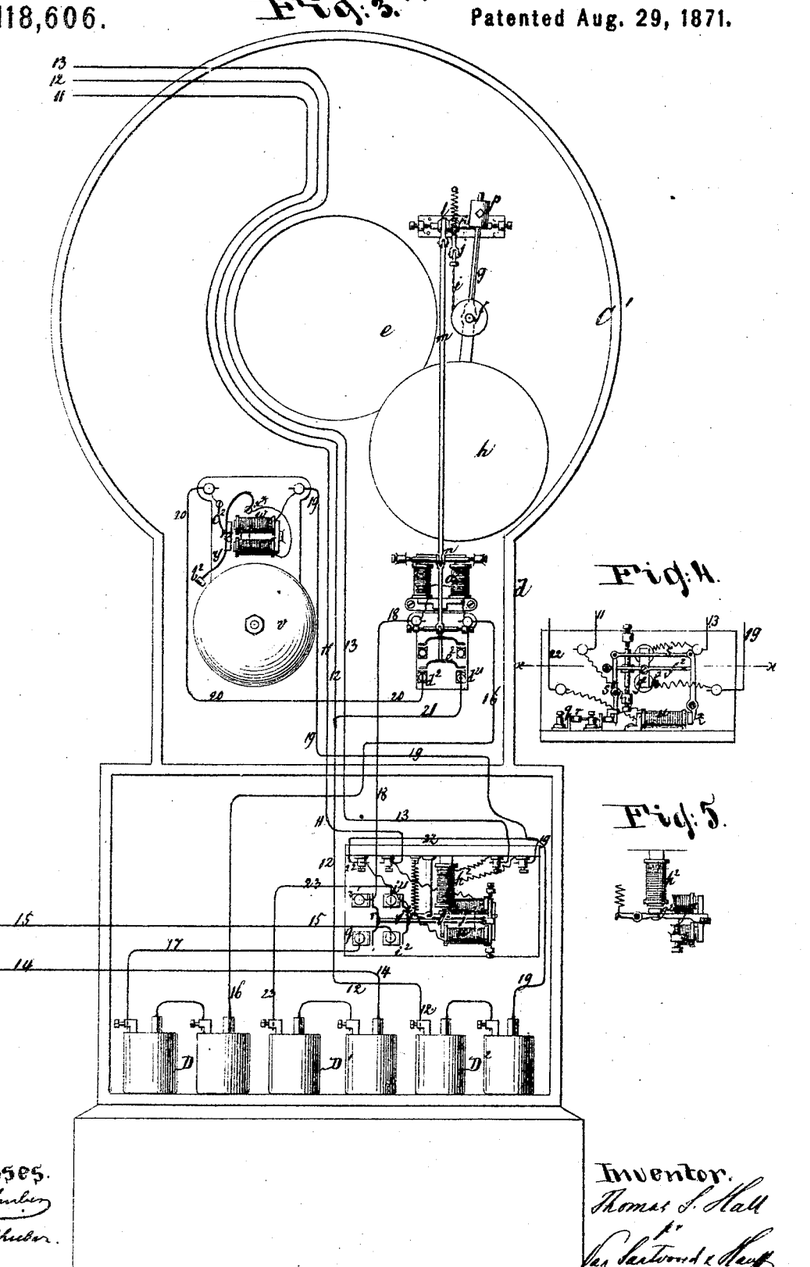
Fig. 3 is a sectional face view of the main signal-house, together with the mechanism for operating the same, in a larger scale than the previous figures.
Fig. 4 is a detached sectional front view of the double-circuit instrument.
Fig. 5 is a horizontal section of the same in the plane $x\ x$, Fig. 4.

In Fig. 2 of the drawing I have represented my system of signals as applied to a double-track road. The arrows on the tracks indicate the direction in which the trains run. If a train runs on the track $A^*$, its wheels depress the raising track-key $a^6$, and the circuit through the magnets of the signal-houses $C^3$ and $C^2$ is closed. The signals of these houses are immediately put on and kept on until the wheels of the train depress the reversing track-key $a^4$, thereby closing the circuit through the taking-off magnet of the signal-house $C^3$, and as soon as the armature of this magnet is attracted the signals of both houses $C^2$ and $C^3$ are taken off. The signal-house $C^1$ is close to the signal-house $C^2$, and immediately after the train has passed the key $a^4$, it strikes the key $a^1$, and the signals of the houses $C^1$ and $C$ are put on. During the time a train is between the two signal-houses constituting one pair the signal behind and that in front are both displayed, and no accident can happen from a succeeding train running into that one ahead, except by the grossest carelessness. The trains running on the track $A^{1*}$ act on the signals in the houses $C^{1*}$ $C^*$ in the same manner as above explained. It must be remarked that one of the wires 14 or 15 can be replaced by a ground-circuit, so that only one wire will be required to connect the two signal-houses in each pair. In some cases it may be desirable to separate the bell from the signal-house, for instance, in proximity to a station. In this case I place a signal-house on each side of the station, at distance of half a mile, more or less, from the station-house, the signal in one of said signal-houses being put on by the train approaching the station on one track, and the signal in the other signal-house by the train approaching in the opposite direction on the other track. The bell connecting with one signal-house is put up at one end of the station-house, and that connecting with the other signal-house at the opposite end. As soon as a train passes the signal-house the signal is displayed and the bell begins to ring, thereby calling the attention of the passengers and of the employés of the road to the fact that the train is approaching. The signal remains displayed until the train leaves the station, so that no danger exists that a succeeding train will run into the train stopping at the station.

Figure 10:
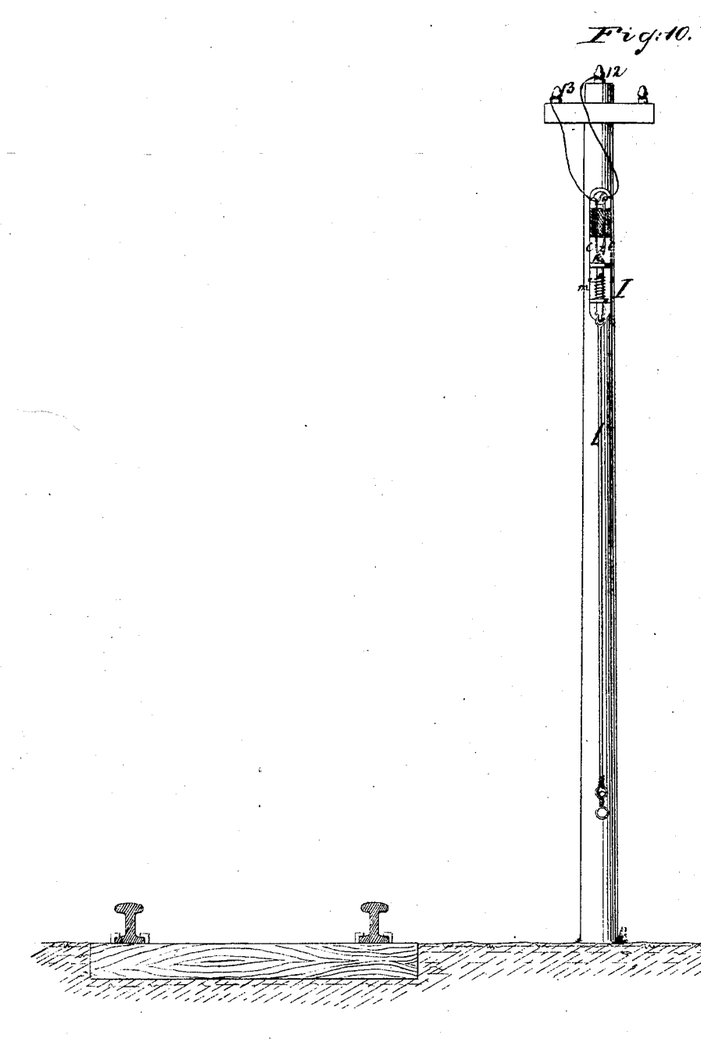
Figs. 10 and 11 are sectional views of hand-keys for raising or for reversing the signal.
Figure 11:
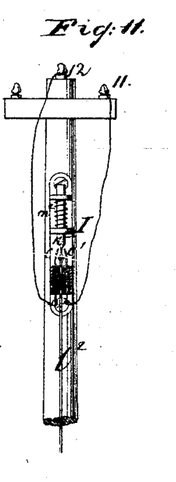

In some cases it is desirable to put on the signal or to start the alarm-bell by hand. For this purpose I use hand-keys I, such as shown in Figs. 10 and 11. They consist of two springs, $c$ $c^1$, similar to those of the track-keys, and of a side bolt, $k^2$, which is operated by a rod, $l^2$. Said bolt is subjected to the action of a spring, $m^2$, which may be arranged as shown in Fig. 10, where it has a tendency to drive the bolt up toward the springs $c$ $c^1$; or which may be arranged as shown in Fig. 11, where it has a tendency to drive the bolt away from said springs. In the former case the rod $l^2$ serves to retain the bolt against the action of its spring, and if the rod is released the bolt is brought in contact with the two springs $c$ $c^1$. In the second case (see Fig. 11) the rod $l^2$ serves to draw the bolt down between the springs $c$ $c^1$. The springs $c$ $c^1$ connect either with the wires 12 and 13 or with the wires 11 and 12, and, by the action of these hand-keys, the signal can be put on or taken off at any moment. For instance, it may be desirable to prevent a train from running up to a station while another train is standing there. In this case the station-master operates the proper hand-key, and the signal outside of the station is put on, telling the engineer of an approaching train to stop. With the line-signals I have combined crossing-signals, as represented in Figs. 7 and 8, the crossing-signal, as applied to a single-track road, being shown in Fig. 7, while its application to a double-track road is shown in Fig. 8.

Figure 7:
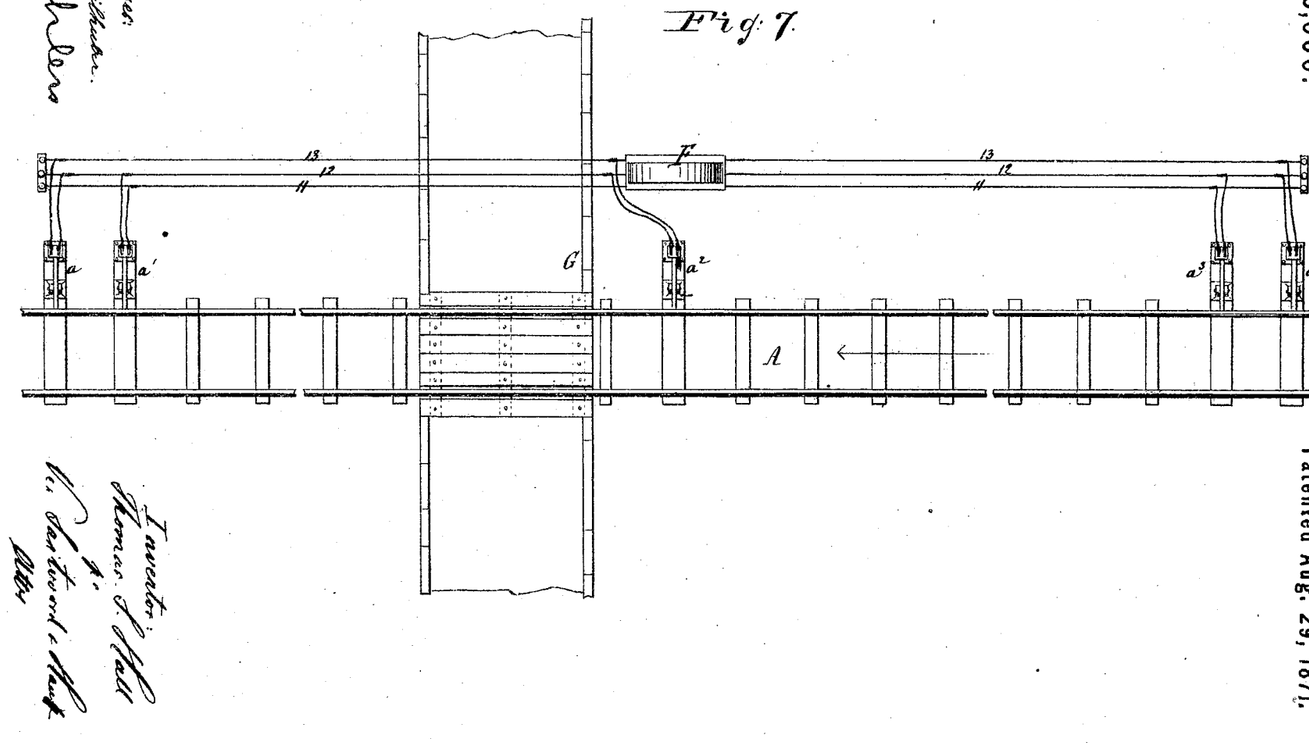
Fig. 7 shows a plan of my apparatus as applied to a crossing-signal of a single-track road.

In Fig. 7, A designates the track which crosses a street, G. On one side of the street, near the track, is placed a signal-house, F, similar to that shown in Fig. 3, with the exception that the line-wires 11, 12, and 13 extend out of the signal-house in opposite directions, as shown in Fig. 7. With these line-wires are combined five track-keys, $a$ $a^1$ $a^2$ $a^3$ $a^4$, the keys $a$, $a^2$, and $a^4$ being raising-keys, and the keys $a^1$ and $a^3$ reversing-keys. If a train approaches in the direction of the arrow marked on the track in Fig. 7, it first acts on the opening-key $a^4$, which produces no effect; but immediately thereafter it strikes the key $a^3$, which closes the circuit through the line and signal-magnets in the house F, and thereby the signal is put on. As the train passes the signal-house it strikes the key $a^2$, and the signal is taken off, and since the action of the reversing-key $a^1$ is immediately counteracted by the raising-key $a$, the signal remains off until a succeeding train arrives. If a train approaches in a direction opposite the arrow the effect on the signal is the same as above described, the keys $a$ and $a^1$ taking the places of the keys $a^3$ and $a^4$.

Figure 8:
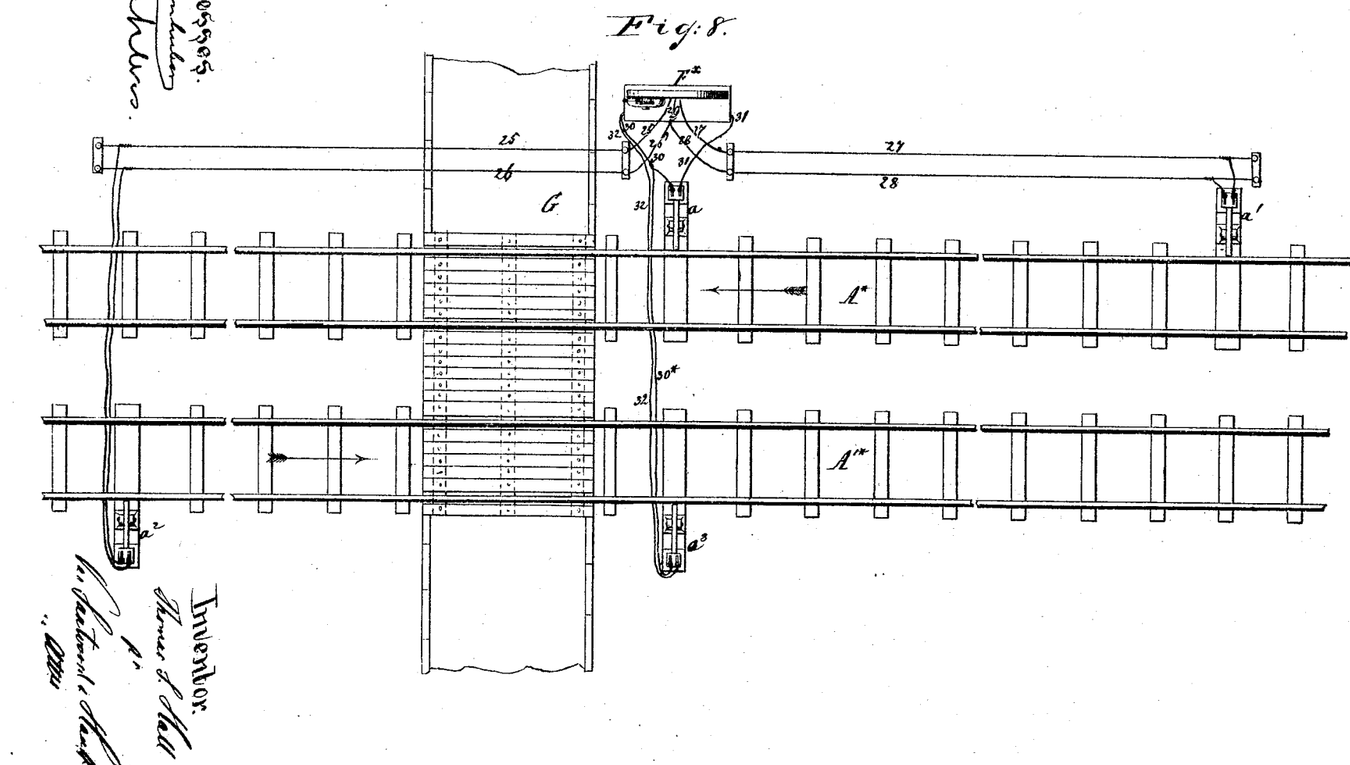
Fig. 8 is a similar view of the same as applied to a crossing-signal of a double-track road.
Figure 9:
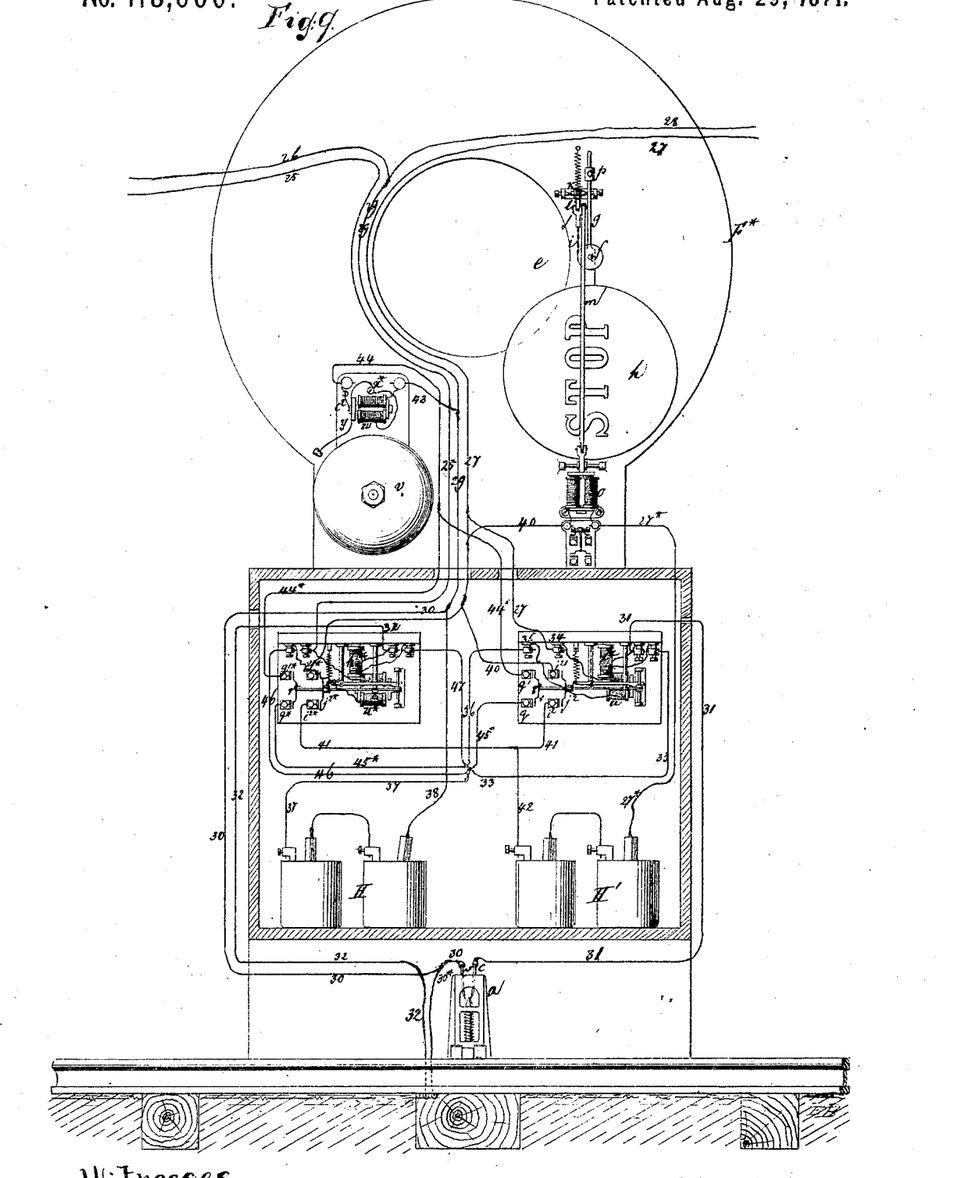
Fig. 9 is a sectional face view of a crossing-signal in the same scale as Fig. 3.

In Fig. 8, $A^*$ $A^{1*}$ designate a double-track road which crosses a street, G. On the side of this street is situated the crossing signal-house $F^*$, the internal arrangement of which is shown in Fig. 9 on a larger scale than the previous figure. On the side of the track $A^*$ are two track-keys, $a$ $a^1$, and on the side of the track $A^{1*}$ are two other keys, $a^2$ $a^3$. The raising-keys $a^1$ and $a^3$ are situated on opposite sides of the signal-house, at distances of half a mile (more or less) therefrom, and the key $a^1$ connects with the signal-house by wires 27 and 28, while the key $a^2$ connects with the same by wires 25 and 26. The wires 26 and 28 unite in the signal-house, or close to it, forming one wire, 29. The reversing track-keys $a$ $a^3$ are situated opposite the signal-house, and the key $a$ connects with the signal-house by wires 30 and 31, while the key $a^3$ connects therewith by wires $30^*$ and 32. In the interior of the signal-house is the signal $h$ with its magnet $o$, the alarm-bell $v$ with its magnet $w$, and two double-circuit instruments, one containing the magnets $u$ and $h^2$ and the other the magnets $u^*$ and $h^{2*}$, and both constructed precisely like the double-circuit instrument in the signal-house C¹, Fig. 3. Two batteries, H H', supply the electric currents.

If a train approaches the crossing on the track A* and the key $a^1$ is depressed, the circuit through the line-magnet $u$ is closed through wire 27, stud 34, helix $u$, stud 35, wires 36 and 37, which latter connects with one pole of the battery H, the other pole of which connects, by wires 38 and 29, with wire 28, which is brought in metallic contact with wire 27 by the key $a^1$. The signal $h$ is put on and the alarm-bell started, until the circuit through the taking-off magnet $h^2$ is closed, which takes place, if the train strikes the reversing track-key $a$, as follows: One of the springs, $c$, of said key connects, by a wire, 31, with one end of the helix of the magnet $h^2$, the other end of which connects, by wires 33 and 37, with one pole of battery H. The other spring, $c^1$, of the track-key $a$ connects, by wires 30 and 38, with the other pole of the battery H. As soon as the armature of the electro-magnet $h^2$ is attracted the latch $f^2$ is released, the key $j^2$ drops back from the abutment $i^2\ i^{21}$, and the current through the signal-magnet $o$ is broken; consequently, the signal is taken off precisely in the same manner as in the line signal-house represented in Fig. 3. The signal-magnet $o$ is operated by the battery H', and one end of its helix connects, by wire 27*, with one pole of said battery, while the other end of said helix connects, by wires 40 27 41, with the abutment $i^{21}$. The abutment $i^2$ connects, by wires 41 42, with the other pole of battery H'.

The alarm-bell magnet $w$ is operated by the battery H, one end of its helix being connected through stud $x$, springs $y$ and $c^2$, wires 44 44*, abutment $q'\ q^*$, keys $r$ and $r^*$, abutments $q$ and $q^*$, wires 45 and 45*, and wire 37 with one pole of said battery, while the other end of the helix $w$ connects, through wires, 43, 29, and 38, with the other pole of the battery H.

If a train approaches on the track A¹*, the signal is raised and the alarm-bell started by the action of the wheel on the raising-key $a^2$, whereby the circuit through the electro-magnet $u^*$ is closed by wires 25, 46, and 37, and wires 26, 29, and 38, and the signal is taken off by the reversing-key $a^3$ through wires 32, helix $h^{2*}$, and wires 47 and 37, connecting with one pole of battery H, and, by wires 30*, 30, and 38, connecting with the other pole of said battery.

If two trains approach on both tracks nearly at the same time, the train first passing its reversing-keys must not take off the signal, but the signal must be kept displayed until the second train passes its reversing-key. This object is effected as follows:

Suppose a train approaches on track A¹*, and while this train is running between the track-keys $a^2\ a^3$ another train approaches on the track A* and passes the raising-key $a^1$ before the first train has reached the reversing-key $a^3$. In this case, by the action of the key $a^1$ the circuit is closed through the helix of the line-magnet $u$, and the keys $j^2$ and $r$ are held in contact with their abutments $i^2\ i^{21}$ and $q\ q'$. If the first train strikes the reversing-key $a^3$ the circuit through the taking-off magnet $h^{2*}$ is closed and the keys $j^{2*}\ r^*$ are allowed to fall back from their abutments, but the keys $j^2\ r$ remain in contact with their abutments, and the signal is kept displayed, and the alarm-bell continues to ring until the second train strikes its reversing-key $a$, whereby the circuit through the taking-off magnet $h^2$ is closed, and the signal is taken off and the alarm-bell stopped.

If there are several crossings not far from each other, one crossing signal-house may be put up at a point visible from all the crossings, while close to each crossing an alarm-bell is put, and all the alarm-bells are connected with and operated from the signal-house in the same manner in which the alarm-bell $v$ is operated.

What I claim as new, and desire to secure by Letters Patent, is—

1. The combination of visible or audible signals with raising and reversing-keys actuated by a locomotive or car, and with two electro-magnets, one for closing and the other for opening the circuit through the signal-magnet, said signals being displayed or started automatically by the action of the train on the raising-keys, and kept displayed or in action till the train has passed the point of danger, and then taken off or stopped automatically by the action of the train on the reversing-keys, substantially as described.

2. The arrangement, with a railroad track, of a series of pairs of signal-houses, the signal-houses forming each pair being placed at suitable distances apart and connected by wires 14 and 15, and operated by the action of the trains on raising and reversing-keys, substantially in the manner herein shown and described.

3. The arrangement of line-wires 11 12 13, raising and reversing-keys $a\ a^1\ a^2\ a^3$, and signal-house C¹, all constructed and operating substantially as herein set forth.

4. The combination of the line-wires 11 and 12 with the battery D², line-magnet $u$, and signal-magnet $o$, substantially as described.

5. The combination of the line-wires 11 and 12 with the battery D², line-magnet $u$, signal-magnet $o$, and alarm-bell magnet $w$, substantially as set forth.

6. The catch or latch $f^2$, in combination with line-magnet $u$, line-wires 11 and 12, key $r$, abutments $q\ q'$, and signal-magnet $o$, whereby the circuit through the signal-magnet is kept closed after the train has passed the raising-key of the line-magnet, substantially as described.

7. The line-wires 12 13, taking-off magnet $h$, and reversing-key to be acted on by a passing train, in combination with the catch or latch $f^2$, key $r$, and signal-magnet $o$, substantially as set forth.

8. The line-magnet $u$, key $j^2$, and battery D¹ in the signal-house C¹, in combination with wires 14 15, and with a magnet, $o^*$, in the signal-house C, substantially as described.

9. The combination, with a single-track road, of a signal-house, F, wires 11, 12, and 13 extending therefrom in two directions and parallel to the track, or nearly so, and keys $a,\ a^1,\ a^2,\ a^3$, and $a^4$, substantially as set forth.

10. The combination, with a double-track road, of a signal-house, F*, wires 25, 26, 27, and 28, and keys $a$ $a^1$ $a^2$ $a^3$, substantially as described.

11. The method, substantially as herein described, of keeping the signal displayed or in action when two trains approach a crossing in opposite directions nearly at the same time, consisting of two double-circuit instruments connected to the signal or signals and to the keys $a$ $a^1$ $a^2$ $a^3$, substantially in the manner set forth.

12. The hand-keys I, constructed substantially as described and shown in Figs. 10 and 11.

THOMAS S. HALL.

Witnesses:
W. HAUFF,
E. F. KASTENHUBER.